(12) United States Patent
Fukunaga et al.

(10) Patent No.: US 9,711,827 B2
(45) Date of Patent: Jul. 18, 2017

(54) SODIUM MOLTEN SALT BATTERY

(71) Applicant: Sumitomo Electric Industries, Ltd., Osaka-shi (JP)

(72) Inventors: Atsushi Fukunaga, Osaka (JP); Shinji Inazawa, Osaka (JP); Koji Nitta, Osaka (JP); Shoichiro Sakai, Osaka (JP); Eiko Imazaki, Osaka (JP); Koma Numata, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/891,626

(22) PCT Filed: Mar. 7, 2014

(86) PCT No.: PCT/JP2014/055921
§ 371 (c)(1),
(2) Date: Nov. 16, 2015

(87) PCT Pub. No.: WO2014/185125
PCT Pub. Date: Nov. 20, 2014

(65) Prior Publication Data
US 2016/0126599 A1    May 5, 2016

(30) Foreign Application Priority Data
May 17, 2013    (JP) .................................. 2013-105410

(51) Int. Cl.
*H01M 10/39*    (2006.01)
*H01M 10/054*   (2010.01)
(Continued)

(52) U.S. Cl.
CPC ......... *H01M 10/399* (2013.01); *H01M 4/583* (2013.01); *H01M 4/587* (2013.01);
(Continued)

(58) Field of Classification Search
None
See application file for complete search history.

(56) References Cited

U.S. PATENT DOCUMENTS

2014/0170458 A1* 6/2014 Nitta ................... H01M 10/399
429/103

FOREIGN PATENT DOCUMENTS

CN     1487620 A     4/2004
CN    102993119 A    3/2013
(Continued)

OTHER PUBLICATIONS

International Search Report in PCT International Application No. PCT/JP2014/055921, dated Apr. 28, 2014.
(Continued)

*Primary Examiner* — Sarah A Slifka
(74) *Attorney, Agent, or Firm* — Venable LLP; Michael A. Sartori; F. Brock Riggs

(57) ABSTRACT

Provided is a sodium molten-salt battery having good charge-discharge cycle characteristics. The sodium molten-salt battery includes a positive electrode that contains a positive electrode active material, a negative electrode that contains a negative electrode active material, and a molten-salt electrolyte that contains a sodium salt and an ionic liquid that dissolves the sodium salt. The negative electrode active material contains non-graphitizable carbon. The ionic liquid is a salt of a bis(sulfonyl)imide anion and a first onium cation that does not cause a Faradaic reaction with the non-graphitizable carbon. The molten-salt electrolyte contains a second onium cation in an amount of 1,000 ppm by mass or less. The second onium cation is represented by a general formula (1): $R^1R^2R^3R^4N^+$ where $R^1$ to $R^4$ are each independently a hydrogen atom or a methyl group.

4 Claims, 5 Drawing Sheets

(51) Int. Cl.
    *H01M 10/0566* (2010.01)
    *H01M 4/587* (2010.01)
    *H01M 4/583* (2010.01)

(52) U.S. Cl.
    CPC ..... *H01M 10/054* (2013.01); *H01M 10/0566* (2013.01); *H01M 2220/10* (2013.01); *H01M 2220/20* (2013.01); *H01M 2300/0022* (2013.01); *H01M 2300/0045* (2013.01); *H01M 2300/0048* (2013.01)

(56) References Cited

FOREIGN PATENT DOCUMENTS

| | | |
|---|---|---|
| JP | 2002-110230 A | 4/2002 |
| JP | 2007-207675 A | 8/2007 |
| JP | 2007-299569 A | 11/2007 |
| JP | 2008-179622 A | 8/2008 |
| JP | 2012-134126 A | 7/2012 |
| WO | WO-2010/010613 A1 | 1/2010 |

OTHER PUBLICATIONS

Notification of First Office Action in counterpart Chinese Patent Application No. 201480028721.1, dated Nov. 28, 2016.

* cited by examiner

SODIUM MOLTEN SALT BATTERY

TECHNICAL FIELD

The present invention relates to a sodium molten-salt battery that includes a molten-salt electrolyte having sodium ion conductivity and in particular, to an improvement of a molten-salt electrolyte.

BACKGROUND ART

In recent years, the demand for non-aqueous electrolyte secondary batteries has been increasing as high-energy density batteries that can store electrical energy. Among non-aqueous electrolyte secondary batteries, molten-salt batteries that use flame-retardant molten-salt electrolytes are advantageous in terms of good thermal stability. In particular, sodium molten-salt batteries that use molten-salt electrolytes having sodium ion conductivity can be produced from inexpensive raw materials and thus are regarded as promising next-generation secondary batteries.

Promising molten-salt electrolytes are ionic liquids which are each a salt of an onium cation and a bis(sulfonyl)imide anion (refer to PTL 1). However, the history of the development of ionic liquids is short, and ionic liquids containing various minor components as impurities are used at present. Furthermore, there have been few studies on the effects of impurities on molten-salt batteries, and the effects are in an unexplored area.

CITATION LIST

Patent Literature

PTL 1: Japanese Unexamined Patent Application Publication No. 2002-110230

SUMMARY OF INVENTION

Technical Problem

In the case where an ionic liquid is a salt of an onium cation and a bis(sulfonyl)imide anion, and a negative electrode active material contains non-graphitizable carbon, a decrease in the charge-discharge capacity is observed when a charge-discharge cycle of a sodium molten-salt battery is repeated.

Solution to Problem

The inventors of the present invention analyzed impurities in various ionic liquids which were each a salt of an onium cation and a bis(sulfonyl)imide anion and evaluated charge-discharge cycle characteristics of molten-salt batteries including the analyzed ionic liquids. According to the results, it was found that ionic liquids contained, as an impurity, an onium cation that might cause a side reaction with non-graphitizable carbon. It was also found that the charge-discharge cycle characteristics significantly changed with a change in the concentration of the onium cation contained as an impurity.

The present invention has been achieved on the basis of the above findings.

Specifically, an aspect of the present invention relates to a sodium molten-salt battery including a positive electrode that contains a positive electrode active material, a negative electrode that contains a negative electrode active material, and a molten-salt electrolyte that contains a sodium salt and an ionic liquid that dissolves the sodium salt, in which the negative electrode active material contains non-graphitizable carbon, the ionic liquid is a salt of a bis(sulfonyl)imide anion and a first onium cation that does not cause a Faradaic reaction with the non-graphitizable carbon, the molten-salt electrolyte contains a second onium cation in an amount of 1,000 ppm by mass or less, and the second onium cation is represented by a general formula (1): $R^1R^2R^3R^4N^+$ where $R^1$ to $R^4$ are each independently a hydrogen atom or a methyl group.

Advantageous Effects of Invention

According to the present invention, a decrease in a capacity retention rate during charge-discharge cycles of a sodium molten-salt battery can be suppressed.

DESCRIPTION OF EMBODIMENTS

Description of Embodiments of Invention

Figure 1:
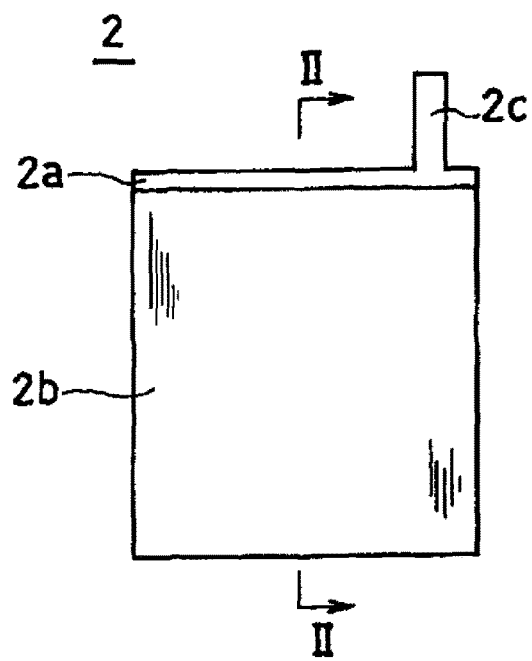
FIG. 1 is a front view of a positive electrode according to an embodiment of the present invention.

First, the contents of embodiments of the present invention will be listed and described.

An aspect of the present invention relates to a sodium molten-salt battery including a positive electrode that contains a positive electrode active material, a negative electrode that contains a negative electrode active material, and a molten-salt electrolyte that contains a sodium salt and an ionic liquid that dissolves the sodium salt, in which the negative electrode active material contains non-graphitizable carbon, the ionic liquid is a salt of a bis(sulfonyl)imide anion and a first onium cation that does not cause a Faradaic reaction with the non-graphitizable carbon, the molten-salt electrolyte contains a second onium cation in an amount of 1,000 ppm by mass or less, and the second onium cation is represented by a general formula (1): $R^1R^2R^3R^4N^+$ where $R^1$ to $R^4$ are each independently a hydrogen atom or a methyl group.

The second onium cation is an impurity that is usually contained in a molten-salt electrolyte in an amount of 2,000 ppm by mass or more. Since the second onium cation has a small ion size, the second onium cation may be intercalated in non-graphitizable carbon during charging. Although details of a reaction between the second onium cation and non-graphitizable carbon are not known, it is believed that intercalation of sodium ions in non-graphitizable carbon and deintercalation of sodium ions from non-graphitizable carbon are inhibited by this reaction, and thus a capacity retention rate decreases during charge-discharge cycles of a sodium molten-salt battery. On the other hand, by controlling the concentration of the second onium cation contained in the molten-salt electrolyte to 1,000 ppm by mass or less, a decrease in the capacity retention rate can be suppressed.

The first onium cation needs to function stably as a main component of the molten-salt electrolyte. Accordingly, as the first onium cation, an ion species that has a relatively large ion size and that does not inhibit intercalation of sodium ions in non-graphitizable carbon and deintercalation of sodium ions from non-graphitizable carbon is selected. The first onium cation is not intercalated in non-graphitizable carbon and does not cause a Faradaic reaction with non-graphitizable carbon.

In the case where the first onium cation is a nitrogen-containing onium cation, the molten-salt electrolyte preferably contains the second onium cation in an amount of 5 to 500 ppm by mass, for example, 50 to 500 ppm by mass. Consequently, a decrease in the capacity retention rate during charge-discharge cycles can be further suppressed, and generation of gas can be suppressed in the case where a charge-discharge cycle is repeated for a long period of time.

The first onium cation is preferably, for example, an organic onium cation having a nitrogen-containing heterocycle. Organic onium cations having nitrogen-containing heterocycles have high heat resistance and form ionic liquids having a low viscosity, and thus are suitable as main components of molten-salt electrolytes.

The nitrogen-containing heterocycle preferably has a pyrrolidine skeleton. Ionic liquids containing organic onium cations having a pyrrolidine skeleton have particularly high heat resistance and a low viscosity, and thus are promising as main components of molten-salt electrolytes.

The sodium salt dissolved in the ionic liquid is preferably a salt of a sodium ion and a bis(sulfonyl)imide anion. By using a salt of a sodium ion and a bis(sulfonyl)imide anion, a molten-salt electrolyte having high heat resistance and high ion conductivity can be obtained.

The positive electrode active material is a material that electrochemically intercalates and deintercalates sodium ions. The negative electrode active material may be a material that electrochemically intercalates and deintercalates sodium ions. Alternatively, the negative electrode active material may be metallic sodium, a sodium alloy (such as a Na—Zn alloy), or a metal (such as Zn) that alloys with sodium.

Details of Embodiments of Invention

Next, details of embodiments of the present invention will be described.

Components of the sodium molten-salt battery will now be described in detail.

The scope of the present invention is not limited to embodiments described below but is defined by the claims. It is intended that the scope of the present invention includes equivalents of the claims and all modifications within the scope of the claims.

[Molten-Salt Electrolyte]

The molten-salt electrolyte contains a sodium salt and an ionic liquid that dissolves the sodium salt.

The ionic liquid is a salt of a bis(sulfonyl)imide anion and a first onium cation that does not cause a Faradaic reaction with non-graphitizable carbon. The molten-salt electrolyte is a liquid in an operational temperature range of the sodium molten-salt battery. The sodium salt corresponds to a solute of the molten-salt electrolyte. The ionic liquid functions as a solvent that dissolves the sodium salt.

The molten-salt electrolyte has an advantage in that it has high heat resistance and incombustibility. Accordingly, it is desirable that the molten-salt electrolyte contain as small an amount of a component other than a sodium salt and an ionic liquid as possible. However, various additives may be incorporated in the molten-salt electrolyte in an amount that does not significantly impair heat resistance and incombustibility. So as not to impair heat resistance and incombustibility, the sodium salt and the ionic liquid account for preferably 90% by mass or more, and more preferably 95% by mass or more of the molten-salt electrolyte.

The molten-salt electrolyte contains, as an impurity, a trace amount of a second onium cation represented by a general formula (1): $R^1R^2R^3R^4N^+$ where $R^1$ to $R^4$ are each independently a hydrogen atom or a methyl group. Specifically, the second onium cation is at least one selected from the group consisting of an inorganic ammonium ion ($NH_4^+$), a methyl ammonium ion, a dimethyl ammonium ion, a trimethyl ammonium ion, and a tetramethyl ammonium ion. The ionic liquid may contain one second onium cation alone or a plurality of second onium cations.

Details of the effect of the second onium cation on the sodium molten-salt battery are not known. However, in the case where non-graphitizable carbon is used as the negative electrode active material, a decrease in the charge-discharge capacity which is assumed to be due to the second onium cation is observed. In contrast, a decrease in the charge-discharge capacity is not observed in a sodium molten-salt battery in which metallic sodium or a sodium alloy is used as a negative electrode.

According to these results, it is believed that a side reaction between the non-graphitizable carbon and the second onium cation occurs during charging and discharging of a sodium molten-salt battery.

According to an analysis of charge-discharge curves of a sodium molten-salt battery in which a negative electrode active material contains non-graphitizable carbon, an ionic liquid is a salt of an organic onium cation having a nitrogen-containing heterocycle and a bis(sulfonyl)imide anion, and a molten-salt electrolyte contains, as an impurity, about 5,000 ppm of an ammonium cation ($NH_4^+$), peaks relating to intercalation and deintercalation of the ammonium cation are observed.

The second onium cation is mixed in an ionic liquid as an impurity when an ionic liquid containing a bis(sulfonyl)imide anion is produced industrially. For example, a bis(fluorosulfonyl)imide anion is produced by a reaction described below.

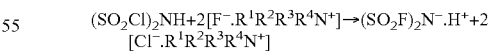

$$(SO_2Cl)_2NH + 2[F^-.R^1R^2R^3R^4N^+] \rightarrow (SO_2F)_2N^-.H^+ + 2[Cl^-.R^1R^2R^3R^4N^+]$$

The produced ionic liquid containing a bis(sulfonyl)imide anion is purified by a purification step such as water washing. However, a significant amount of the second onium cation ($R^1R^2R^3R^4N^+$) remains as an impurity in the ionic liquid.

The concentration of the second onium cation contained in the molten-salt electrolyte is 1,000 ppm by mass or less, preferably 500 ppm by mass or less, and more preferably 300 ppm by mass or less. Consequently, the effect of suppressing a decrease in the capacity retention rate during charge-discharge cycles increases.

In the case where the first onium cation is a nitrogen-containing onium cation, the concentration of the second onium cation contained in the molten-salt electrolyte is preferably 5 ppm by mass or more, and more preferably 20 ppm by mass or more. Consequently, the effect of suppressing the generation of gas is obtained in the case where a charge-discharge cycle is repeated for a long period of time. That is, the molten-salt electrolyte preferably contains the second onium cation in some cases as long as the amount of the second onium cation is very small. Although the reason why the generation of gas is suppressed is not clear, it is probably believed that a decomposition reaction of the first onium cation is suppressed by the presence of 5 ppm or more (for example, 50 ppm) of the second onium cation in the molten-salt electrolyte on the basis of the principle of equilibrium. This is because the decomposition reaction of the first onium cation containing nitrogen occurs with the generation of $NH_4^+$ and primary to quaternary methyl ammonium cations.

The upper limit and the lower limit of the concentration of the second onium cation may be appropriately combined to determine a preferred range. For example, a preferred range of the concentration of the second onium cation may be 5 to 1,000 ppm or 20 to 500 ppm.

Examples of a method for reducing the concentration of the second onium cation in a molten-salt electrolyte or an ionic liquid include a method for purifying a molten-salt electrolyte or an ionic liquid with an adsorbent and a method for purifying an ionic liquid by recrystallization. However, the method for purifying a molten-salt electrolyte or an ionic liquid is not particularly limited.

Examples of the adsorbent include, but are not particularly limited to, activated carbon, activated alumina, zeolite, and molecular sieve. These adsorbents usually contain an alkali metal such as potassium or sodium. Accordingly, an ionic liquid that has been allowed to pass through an adsorbent cannot be used in lithium molten-salt batteries or lithium ion secondary batteries. This is because charge-discharge characteristics of lithium ion secondary batteries significantly degrade if alkali metal ions such as potassium ions or sodium ions dissolve into the ionic liquid. For example, since the oxidation-reduction potentials of sodium and potassium are higher than that of lithium, a battery reaction of lithium ions is inhibited. In contrast, since sodium molten-salt batteries originally contain sodium ions, charge-discharge characteristics of the sodium molten-salt batteries do not degrade. In addition, the oxidation-reduction potential of sodium is higher than that of potassium, and potassium does not significantly affect charge-discharge characteristics of sodium molten-salt batteries.

The concentration of the second onium cation contained in a molten-salt electrolyte can be measured by a method such as ion chromatography.

A sodium ion concentration (which is the same as a concentration of a sodium salt when the sodium salt is a monovalent salt) in the molten-salt electrolyte is preferably 2% by mole or more, more preferably 5% by mole or more, and particularly preferably 8% by mole or more of a cation contained in the molten-salt electrolyte. Such a molten-salt electrolyte has good sodium ion conductivity and easily achieves a high capacity even in the case where charging and discharging are performed with a current at a high rate. The sodium ion concentration is preferably 30% by mole or less, more preferably 20% by mole or less, and particularly preferably 15% by mole or less of the cation contained in the molten-salt electrolyte.

Such a molten-salt electrolyte has a high content of an ionic liquid, has a low viscosity, and easily achieves a high capacity even in the case where charging and discharging are performed with a current at a high rate.

The preferred upper limit and lower limit of the sodium ion concentration may be appropriately combined to determine a preferred range. For example, a preferred range of the sodium ion concentration may be 2% to 20% by mole or 5% to 15% by mole.

The sodium salt dissolved in the ionic liquid may be a salt of a sodium ion and an anion such as a borate anion, a phosphate anion, or an imide anion. An example of the borate anion is a tetrafluoroborate anion. An example of the phosphate anion is a hexafluorophosphate anion. An example of the imide anion is a bis(sulfonyl)imide anion. However, the anions are not limited thereto. Among these, a salt of a sodium ion and a bis(sulfonyl)imide anion is preferable. By using a bis(sulfonyl)imide anion, a molten-salt electrolyte having high heat resistance and high ion conductivity is easily obtained.

Examples of the first onium cation include nitrogen-containing onium cations; sulfur-containing onium cations; and phosphorus-containing onium cations. Among these, nitrogen-containing onium cations are particularly preferable. Besides cations derived from an aliphatic amine, an alicyclic amine, or an aromatic amine (e.g., quaternary ammonium cations), for example, organic onium cations having a nitrogen-containing heterocycle (i.e., cations derived from a cyclic amine) are used.

Examples of the quaternary ammonium cation include tetraalkylammonium cations (tetra$C_{1-10}$alkylammonium cations) such as a hexyltrimethylammonium cation, an ethyltrimethylammonium cation ($TEA^+$), and a methyltriethylammonium cation ($TEMA^+$).

Examples of the sulfur-containing onium cation include tertiary sulfonium cations, such as trialkylsulfonium cations (e.g., tri$C_{1-10}$alkylsulfonium cations), namely, a trimethylsulfonium cation, a trihexylsulfonium cation, and a dibutylethylsulfonium cation.

Examples of the phosphorus-containing onium cation include quaternary phosphonium cations such as tetraalkylphosphonium cations (e.g., tetra$C_{1-10}$alkylphosphonium cations), namely, a tetramethylphosphonium cation, a tetraethylphosphonium cation, and a tetraoctylphosphonium cation; and alkyl(alkoxyalkyl)phosphonium cations (e.g., tri$C_{1-10}$alkyl($C_{1-5}$alkoxy$C_{1-5}$alkyl)phosphonium cations), namely, a triethyl(methoxymethyl)phosphonium cation, a diethylmethyl(methoxymethyl)phosphonium cation, and a trihexyl(methoxyethyl)phosphonium cation. In the alkyl(alkoxyalkyl)phosphonium cations, the total number of alkyl groups and alkoxyalkyl groups that bond to a phosphorus atom is 4, and the number of alkoxyalkyl groups is preferably 1 or 2.

The number of carbon atoms of the alkyl group that bonds to a nitrogen atom of a quaternary ammonium cation, a sulfur atom of a tertiary sulfonium cation, or a phosphorus atom of a quaternary phosphonium cation is preferably 1 to 8, more preferably 1 to 4, and particularly preferably 1, 2, or 3.

Examples of the nitrogen-containing heterocycle skeleton include five- to eight-membered heterocycles that have one or two nitrogen atoms as atoms constituting the ring, such as pyrrolidine, imidazoline, imidazole, pyridine, and piperidine; and five- to eight-membered heterocycles that have one or two nitrogen atoms and other heteroatoms (e.g., oxygen atom and sulfur atom) as atoms constituting the ring, such as morpholine.

The nitrogen atoms which are atoms constituting the ring may have an organic group such as an alkyl group as a substituent. Examples of the alkyl group include alkyl groups having 1 to 10 carbon atoms, such as a methyl group, an ethyl group, a propyl group, and an isopropyl group. The number of carbon atoms of the alkyl group is preferably 1 to 8, more preferably 1 to 4, and particularly preferably 1, 2, or 3.

Among the nitrogen-containing heterocycle skeletons, heterocycle skeletons having pyrrolidine, pyridine, or imidazoline are particularly preferable. The first onium cation having a pyrrolidine skeleton preferably has two of the above-mentioned alkyl groups on one nitrogen atom constituting a pyrrolidine ring. The first onium cation having a pyridine skeleton preferably has one of the above-mentioned alkyl groups on one nitrogen atom constituting a pyridine ring. The first onium cation having an imidazoline skeleton preferably has one of the above-mentioned alkyl groups on each of two nitrogen atoms constituting an imidazoline ring.

Specific examples of the first onium cation having a pyrrolidine skeleton include a 1,1-dimethylpyrrolidinium cation, a 1,1-diethylpyrrolidinium cation, a 1-ethyl-1-methylpyrrolidinium cation, a 1-methyl-1-propylpyrrolidinium cation (MPPY$^+$), a 1-butyl-1-methylpyrrolidinium cation (MBPY$^+$), and a 1-ethyl-1-propylpyrrolidinium cation. Among these, pyrrolidinium cations having a methyl group and an alkyl group having 2 to 4 carbon atoms, such as MPPY$^+$ and MBPY$^+$, are preferable in view of particularly high electrochemical stability.

Specific examples of the first onium cation having a pyridine skeleton include 1-alkylpyridinium cations such as a 1-methylpyridinium cation, a 1-ethylpyridinium cation, and a 1-propylpyridinium cation. Among these, pyridinium cations having an alkyl group having 1 to 4 carbon atoms are preferable.

Specific examples of the first onium cation having an imidazoline skeleton include a 1,3-dimethylimidazolium cation, a 1-ethyl-3-methylimidazolium cation (EMI$^+$), a 1-methyl-3-propylimidazolium cation, a 1-butyl-3-methylimidazolium cation (BMI$^+$), a 1-ethyl-3-propylimidazolium cation, and a 1-butyl-3-ethylimidazolium cation. Among these, imidazolium cations having a methyl group and an alkyl group having 2 to 4 carbon atoms, such as EMI$^+$ and BMI$^+$, are preferable.

The ionic liquid may contain only one of the first onium cations or two or more of the first onium cations. The ionic liquid may contain a salt of a cation of an alkali metal other than sodium and a bis(sulfonyl)imide anion. Examples of the cation of such an alkali metal include cations of potassium, lithium, rubidium, and cesium. Among these, potassium is preferable.

Examples of the bis(sulfonyl)imide anion constituting an anion of the ionic liquid or the sodium salt include a bis(fluorosulfonyl)imide anion [(N(SO$_2$F)$_2$)$^-$], (fluorosulfonyl)(perfluoroalkylsulfonyl)imide anions [such as a (fluorosulfonyl)(trifluoromethylsulfonyl)imide anion ((FSO$_2$)(CF$_3$SO$_2$)N$^-$)], and bis(perfluoroalkylsulfonyl)imide anions [such as a bis(trifluoromethylsulfonyl)imide anion (N(SO$_2$CF$_3$)$_2$$^-$) and a bis(pentafluoroethylsulfonyl)imide anion (N(SO$_2$C$_2$F$_5$)$_2$$^-$]. The number of carbon atoms of the perfluoroalkyl group is, for example, 1 to 10, preferably 1 to 8, more preferably 1 to 4, and, in particular, 1, 2, or 3. These anions may be used alone or in combination of two or more anions.

Among the bis(sulfonyl)imide anions, a bis(fluorosulfonyl)imide anion (FSI$^-$); bis(perfluoroalkylsulfonyl)imide anions such as a bis(trifluoromethylsulfonyl)imide anion (TFSI$^-$), a bis(pentafluoroethylsulfonyl)imide anion (PFSI$^-$), and a (fluorosulfonyl)(trifluoromethylsulfonyl)imide anion; and the like are particularly preferable.

Specific examples of the molten-salt electrolyte include a molten-salt electrolyte containing a salt of a sodium ion and FSI$^-$ (Na.FSI) as a sodium salt and a salt of MPPY$^+$ and FSI$^-$ (MPPY.FSI) as an ionic liquid, and a molten-salt electrolyte containing a salt of a sodium ion and TFSI$^-$ (Na.TFSI) as a sodium salt and a salt of MPPY$^+$ and TFSI$^-$ (MPPY.TFSI) as an ionic liquid. In this case, in view of the balance of the melting point, viscosity, and ion conductivity of the molten-salt electrolyte, a molar ratio of the sodium salt to the ionic liquid (sodium salt/ionic liquid) is, for example, 2/98 to 20/80, and preferably 5/95 to 15/85.

[Positive Electrode]

Figure 2:
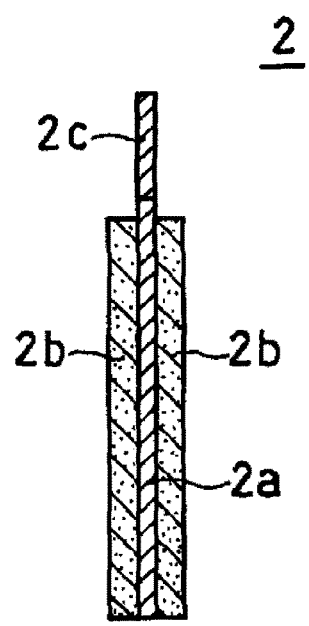
FIG. 2 is a cross-sectional view taken along line II-II in FIG. 1.

FIG. 1 is a front view of a positive electrode according to an embodiment of the present invention. FIG. 2 is a cross-sectional view taken along line II-II in FIG. 1.

A positive electrode 2 for a sodium molten-salt battery includes a positive electrode current collector 2a and a positive electrode active material layer 2b adhering to the positive electrode current collector 2a. The positive electrode active material layer 2b contains, as an essential component, a positive electrode active material and may contain, as optional components, a conductive carbon material, a binder, etc.

As the positive electrode active material, sodium-containing metal oxides are preferably used. The sodium-containing metal oxides may be used alone or in combination of a plurality of sodium-containing metal oxides. An average particle size (particle size D50 at which the cumulative volume of volume particle size distribution is 50%) of particles of the sodium-containing metal oxide is preferably 2 μm or more and 20 μm or less. The term "average particle size D50" refers to a value measured by a laser diffraction/scattering method using a laser diffraction particle size distribution analyzer, and this also applies hereinafter.

For example, sodium chromite (NaCrO$_2$) may be used as the sodium-containing metal oxide. Part of Cr or Na of sodium chromite may be replaced with another element. For example, a compound represented by a general formula: Na$_{1-x}$M$^1_x$Cr$_{1-y}$M$^2_y$O$_2$ (where $0 \leq x \leq 2/3$, $0 \leq y \leq 0.7$, and M$^1$ and M$^2$ are each independently a metal element other than Cr and Na) is preferable. In the general formula, x more preferably satisfies $0 \leq x \leq 0.5$. M$^1$ and M$^2$ are preferably, for example, at least one selected from the group consisting of Ni, Co, Mn, Fe, and Al. Note that M$^1$ represents an element occupying the Na site, and M$^2$ represents an element occupying the Cr site.

Sodium ferromanganate (Na$_{2/3}$Fe$_{1/3}$Mn$_{2/3}$O$_2$ or the like) may also be used as the sodium-containing metal oxide. Part of Fe, Mn, or Na of sodium ferromanganate may be replaced with another element. For example, a compound represented by a general formula: Na$_{2/3-x}$M$^3_x$Fe$_{1/3-y}$Mn$_{2/3-z}$M$^4_{y+z}$O$_2$ (where $0 \leq x \leq 2/3$, $0 \leq y \leq 1/3$, $0 \leq z \leq 1/3$, and M$^3$ and M$^4$ are each independently a metal element other than Fe, Mn, and Na) is preferable. In the general formula, x more preferably satisfies $0 \leq x \leq 1/3$. M$^3$ and M$^4$ are preferably, for example, at least one selected from the group consisting of Ni, Co, and Al. Note that M$^3$ represents an element occupying the Na site, and M$^4$ represents an element occupying the Fe or Mn site.

Furthermore, Na$_2$FePO$_4$F, NaVPO$_4$F, NaCoPO$_4$, NaNiPO$_4$, NaMnPO$_4$, NaMn$_{1.5}$Ni$_{0.5}$O$_4$, NaMn$_{0.5}$Ni$_{0.5}$O$_2$, etc. may be used as the sodium-containing metal oxides.

Examples of the conductive carbon material incorporated in the positive electrode include graphite, carbon black, and carbon fibers. The conductive carbon material is used in order to ensure a good conductive path. Among the conductive carbon materials, carbon black is particularly preferable from the viewpoint that a sufficient conductive path can be easily formed by use of a small amount. Examples of carbon black include acetylene black, Ketjenblack, and thermal black. The amount of conductive carbon material is preferably 2 to 15 parts by mass, and more preferably 3 to 8 parts by mass per 100 parts by mass of the positive electrode active material.

The binder has a function of binding positive electrode active materials to one another and fixing the positive electrode active materials to a positive electrode current collector. Examples of the binder that can be used include fluororesins, polyamides, polyimides, and polyamide-imides. Examples of the fluororesins that can be used include polyvinylidene fluoride (PVDF), polytetrafluoroethylene (PTFE), tetrafluoroethylene-hexafluoropropylene copolymers, and vinylidene fluoride-hexafluoropropylene copolymers. The amount of binder is preferably 1 to 10 parts by mass, and more preferably 3 to 5 parts by mass per 100 parts by mass of the positive electrode active material.

As the positive electrode current collector 2a, a metal foil, a non-woven fabric made of metal fibers, a porous metal sheet, or the like is used. As the metal constituting the positive electrode current collector, aluminum or an aluminum alloy is preferable because it is stable at the positive electrode potential. However, the metal is not particularly limited thereto. In the case where an aluminum alloy is used, the content of a metal component (for example, Fe, Si, Ni, or Mn) other than aluminum is preferably 0.5% by mass or less. The metal foil serving as the positive electrode current collector has a thickness of, for example, 10 to 50 µm. The non-woven fabric made of metal fibers or the porous metal sheet serving as the positive electrode current collector has a thickness of, for example, 100 to 600 µm. A lead piece 2c for current collection may be formed on the positive electrode current collector 2a. The lead piece 2c may be integrally formed with the positive electrode current collector as illustrated in FIG. 1. Alternatively, a lead piece that is separately formed may be joined to the positive electrode current collector by welding or the like.

[Negative Electrode]

Figure 3:
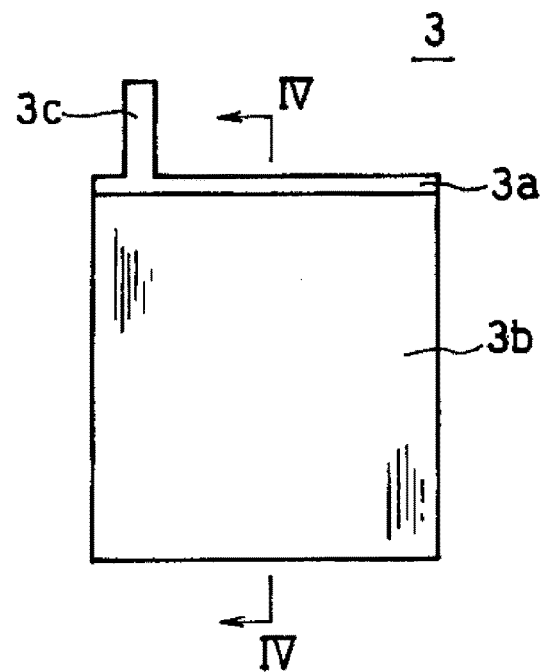
FIG. 3 is a front view of a negative electrode according to an embodiment of the present invention.
Figure 4:
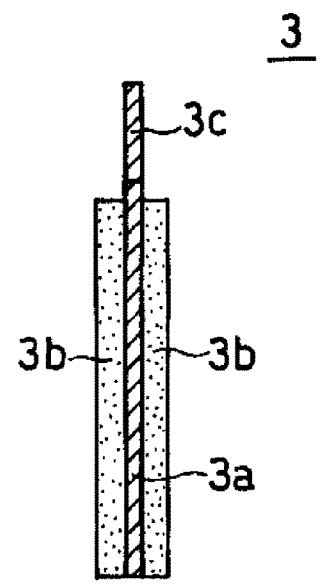
FIG. 4 is a cross-sectional view taken along line IV-IV in FIG. 3.

FIG. 3 is a front view of a negative electrode according to an embodiment of the present invention. FIG. 4 is a cross-sectional view taken along line IV-IV in FIG. 3.

A negative electrode 3 includes a negative electrode current collector 3a and a negative electrode active material layer 3b adhering to the negative electrode current collector 3a.

The negative electrode active material layer 3b contains, as an essential component, a negative electrode active material that can electrochemically intercalate and deintercalate sodium ions and may contain, as optional components, a binder, a conductive material, etc. The materials exemplified for components of the positive electrode may be used as the binder and the conductive material used in the negative electrode. The amount of binder is preferably 1 to 10 parts by mass, and more preferably 3 to 5 parts by mass per 100 parts by mass of the negative electrode active material. The amount of conductive material is preferably 5 to 15 parts by mass, and more preferably 5 to 10 parts by mass per 100 parts by mass of the negative electrode active material.

As the negative electrode active material that can electrochemically intercalate and deintercalate sodium ions, non-graphitizable carbon (hard carbon) is preferably used from the viewpoint of thermal stability and electrochemical stability. Non-graphitizable carbons may be used alone or in combination of two or more.

Non-graphitizable carbon is a carbon material in which a graphite structure is not developed even when the material is heated at a high temperature (for example, 3,000° C.) in an inert atmosphere, and in which minute graphite crystals are arranged in random directions, and there are nanometer-order spaces between crystal layers. Since the diameter of an ion of sodium, which is a typical alkali metal, is 0.95 Å, the size of the spaces is preferably sufficiently larger than this value.

The average particle size (particle size D50 at which the cumulative volume of volume particle size distribution is 50%) of non-graphitizable carbon is, for example, 3 to 20 µm, and preferably 5 to 15 µm from the viewpoint of enhancing the filling property of the negative electrode active material in the negative electrode and suppressing side reactions with the electrolyte (molten salt).

The specific surface area of non-graphitizable carbon is, for example, 1 to 10 $m^2/g$, and preferably 3 to 8 $m^2/g$ from the viewpoint of ensuring the acceptability of sodium ions and suppressing side reactions with the electrolyte.

An average interlayer distance $d_{002}$ of (002) planes measured by an X-ray diffraction (XRD) spectrum of a carbon material is used as an index of the degree of the development of a graphite-type crystal structure in the carbon material. In general, the average interlayer distance $d_{002}$ of a carbon material classified as graphite is small, namely, less than 0.337 nm. In contrast, the average interlayer distance $d_{002}$ of non-graphitizable carbon having a turbostratic structure is large, for example, 0.37 nm or more. The upper limit of the average interlayer distance $d_{002}$ of non-graphitizable carbon is not particularly limited, but the average interlayer distance $d_{002}$ may be, for example, 0.42 nm or less. The average interlayer distance $d_{002}$ of non-graphitizable carbon is, for example, 0.37 to 0.42 nm and may be 0.38 to 0.4 nm.

As the negative electrode current collector 3a, a metal foil, a non-woven fabric made of metal fibers, a porous metal sheet, or the like is used. The metal constituting the negative electrode current collector is preferably, for example, aluminum, an aluminum alloy, copper, a copper alloy, nickel, or a nickel alloy because these metals do not alloy with sodium and are stable at the negative electrode potential. Among these, aluminum and aluminum alloys are preferable in terms of good lightweight property. For example, aluminum alloys the same as those exemplified for the positive electrode current collector may be used as the aluminum alloys. The metal foil serving as the negative electrode current collector has a thickness of, for example, 10 to 50 µm. The non-woven fabric made of metal fibers or the porous metal sheet serving as the negative electrode current collector has a thickness of, for example, 100 to 600 µm. A lead piece 3c for current collection may be formed on the negative electrode current collector 3a. The lead piece 3c may be integrally formed with the negative electrode current collector as illustrated in FIG. 3. Alternatively, a lead piece that is separately formed may be joined to the negative electrode current collector by welding or the like.

[Separator]

A separator may be disposed between the positive electrode and the negative electrode. The material of the separator may be selected in consideration of the operating temperature of the battery. From the viewpoint of suppressing side reactions with molten-salt electrolytes, glass fibers, silica-containing polyolefins, fluororesins, alumina, polyphenylene sulfide (PPS), and the like are preferably used.

Among these, a non-woven fabric made of glass fibers is preferable from the viewpoint of a low cost and high heat resistance. Silica-containing polyolefins and alumina are preferable from the viewpoint of good heat resistance. Fluororesins and PPS are preferable from the viewpoint of heat resistance and corrosion resistance. In particular, PPS has good resistance to fluorine contained in molten salts.

The thickness of the separator is preferably 10 to 500 µm, and more preferably 20 to 50 µm. This is because when the thickness is in this range, internal short-circuit can be effectively prevented, and the volume occupancy ratio of the separator to an electrode group can be suppressed to be low and thus a high capacity density can be achieved.

[Electrode Group]

A sodium molten-salt battery is used in a state in which an electrode group including the positive electrode and the negative electrode, and a molten-salt electrolyte are housed in a battery case. The electrode group is formed by stacking or winding the positive electrode and the negative electrode with a separator interposed therebetween. In this structure, by using a metal battery case and electrically connecting one of the positive electrode and the negative electrode to the battery case, a portion of the battery case can be used as a first external terminal. On the other hand, the other of the positive electrode and the negative electrode is connected, through a lead piece or the like, to a second external terminal which is led to the outside of the battery case in a state of being insulated from the battery case.

Next, a structure of a sodium molten-salt battery according to an embodiment of the present invention will be described. However, it is to be noted that the structure of the sodium molten-salt battery according to the present invention is not limited to the structure described below.

Figure 5:
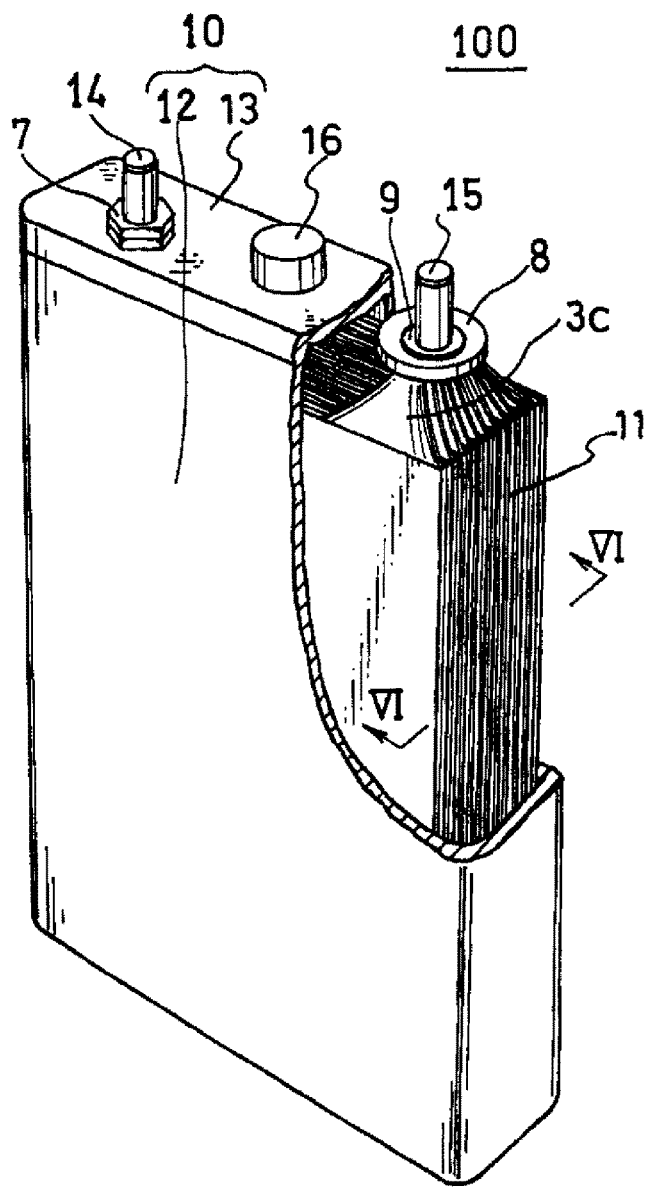
FIG. 5 is a perspective view of a molten-salt battery according to an embodiment of the present invention, in which a battery case is partially cut out.
Figure 6:
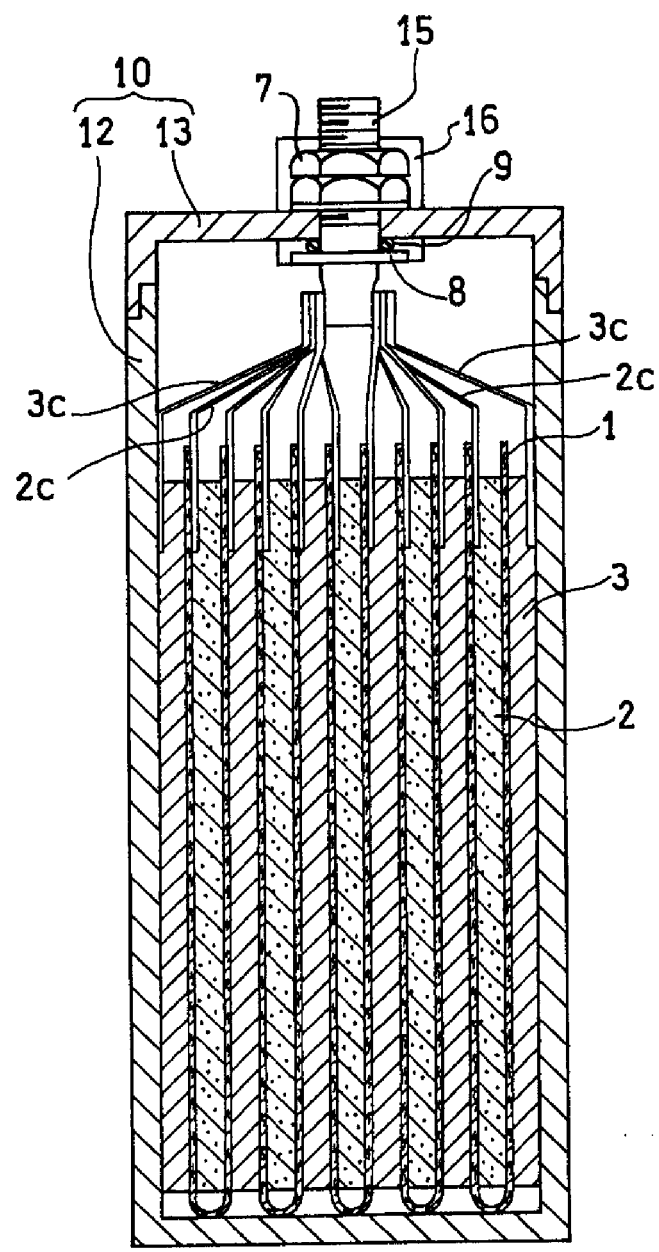
FIG. 6 is a schematic longitudinal cross-sectional view taken along line VI-VI in FIG. 5.

FIG. 5 is a perspective view of a sodium molten-salt battery 100, in which a battery case is partially cut out. FIG. 6 is a schematic longitudinal cross-sectional view taken along the line VI-VI in FIG. 5.

A molten-salt battery 100 includes a stack-type electrode group 11, an electrolyte (not shown), and a rectangular-shaped aluminum battery case 10 which houses these components. The battery case 10 includes a container body 12 having an opening on the top and a closed bottom, and a lid 13 which covers the opening on the top. When the molten-salt battery 100 is assembled, first, the electrode group 11 is formed and inserted into the container body 12 of the battery case 10. Subsequently, a process is performed in which a molten-salt electrolyte is poured into the container body 12, and spaces between a separator 1, a positive electrode 2, and a negative electrode 3 constituting the electrode group 11 are impregnated with the molten-salt electrolyte. Alternatively, after the electrode group is impregnated with the molten-salt electrolyte, the electrode group containing the molten-salt electrolyte may be housed in the container body 12.

An external positive electrode terminal 14 is provided on the lid 13 at a position close to one side, the external positive electrode terminal 14 passing through the lid 13 while being electrically connected to the battery case 10. An external negative electrode terminal 15 is provided on the lid 13 at a position close to the other side, the external negative electrode terminal 15 passing through the lid 13 while being insulated from the battery case 10. A safety valve 16 is provided in the center of the lid 13 for the purpose of releasing gas generated inside when the internal pressure of the battery case 10 increases.

The stack-type electrode group 11 includes a plurality of positive electrodes 2, a plurality of negative electrodes 3, and a plurality of separators 1 interposed therebetween, each having a rectangular sheet shape. In FIG. 6, the separator 1 is formed like a bag so as to enclose the positive electrode 2. However, the form of the separator is not particularly limited. The plurality of positive electrodes 2 and the plurality of negative electrodes 3 are alternately arranged in the stacking direction in the electrode group 11.

A positive electrode lead piece 2c may be formed on one end of each positive electrode 2. By bundling the positive electrode lead pieces 2c of the positive electrodes 2 and connecting the bundle to the external positive electrode terminal 14 provided on the lid 13 of the battery case 10, the positive electrodes 2 are connected in parallel. Similarly, a negative electrode lead piece 3c may be formed on one end of each negative electrode 3. By bundling the negative electrode lead pieces 3c of the negative electrodes 3 and connecting the bundle to the external negative electrode terminal 15 provided on the lid 13 of the battery case 10, the negative electrodes 3 are connected in parallel. The bundle of the positive electrode lead pieces 2c and the bundle of the negative electrode lead pieces 3c are desirably arranged on the right and left sides of one end face of the electrode group 11 with a distance therebetween so as not to be in contact with each other.

Each of the external positive electrode terminal 14 and the external negative electrode terminal 15 is columnar and is provided with a thread groove at least on a portion exposed to the outside. A nut 7 is fit into the thread groove of each terminal. By rotating the nut 7, the nut 7 is fixed to the lid 13. A flange 8 is provided on a portion of each terminal to be housed in the battery case. The flange 8 is fixed to the inner surface of the lid 13 with a washer 9 therebetween by the rotation of the nut 7.

EXAMPLES

Next, the present invention will be described more specifically on the basis of Examples. However, it is to be understood that the present invention is not limited to the Examples below.

Example 1

Fabrication of Negative Electrode

A negative electrode paste was prepared by dispersing 92 parts by mass of non-graphitizable carbon (negative electrode active material) having an average particle size of 9 µm, a specific surface area of 6 m$^2$/g, and a true density of 1.52 g/cm$^3$ and 8 parts by mass of a polyimide (binder) in N-methyl-2-pyrrolidone (NMP). The resulting negative electrode paste was applied onto one surface of a copper foil having a thickness of 18 µm, sufficiently dried, and subjected to rolling. Thus, a negative electrode having a total thickness of 48 µm and including a negative electrode mixture layer with a thickness of 30 µm was fabricated. The negative electrode was punched into a coin shape having a diameter of 12 mm or a rectangular shape of 30 mm×60 mm.

(Fabrication of Counter Electrode)

Metallic sodium having a thickness of 100 µm was attached to one surface of an aluminum foil having a thickness of 20 µm to prepare a counter electrode. The counter electrode was punched into a coin shape having a diameter of 14 mm or a rectangular shape of 32 mm×62 mm.

(Separator)

A polyolefin separator having a thickness of 50 µm and a porosity of 90% was prepared. The separator was also punched into a coin shape having a diameter of 16 mm or a rectangular shape of 34 mm×64 mm.

(Molten-Salt Electrolyte)

A molten-salt electrolyte A1 composed of a mixture containing a commercially available sodium.bis(fluorosulfonyl)imide (Na.FSI: sodium salt) and a commercially available 1-methyl-1-propylpyrrolidinium.bis(fluorosulfonyl)imide (MPPY.FSI: ionic liquid) at a molar ratio Na.FSI: MPPY.FSI of 10:90 was prepared.

Impurities in the molten-salt electrolyte A1 were analyzed by ion chromatography. According to the result, an inorganic ammonium ion ($NH_4^+$) was contained as an impurity in an amount of 5,000 ppm or more.

Next, the commercially available MPPY.FSI was purified by passing through a column filled with zeolite (HS-320 manufactured by Wako Pure Chemical Industries, Ltd.), and then mixed with Na.FSI. Thus, a molten-salt electrolyte B1 composed of a mixture containing MPPY.FSI and Na.FSI at a molar ratio MPPY.FSI:Na.FSI of 90:10 was prepared.

Impurities in the molten-salt electrolyte B1 were analyzed by ion chromatography. According to the result, an inorganic ammonium ion ($NH_4^+$) was not detected. The detection limit concentration is 1 ppm.

(Fabrication of Coin-Type Sodium Molten-Salt Battery)

The coin-shaped negative electrode, counter electrode, and separator were dried sufficiently by heating at 90° C. or higher at a reduced pressure of 0.3 Pa. Subsequently, the coin-shaped negative electrode was placed in a shallow-bottomed, cylindrical container composed of an Al/SUS cladding material. The coin-shaped counter electrode was placed on the negative electrode with the coin-shaped separator therebetween. A predetermined amount of the molten-salt electrolyte B1 was poured into the container. The opening of the container was then sealed with a shallow-bottomed, cylindrical sealing plate that was composed of an Al/SUS cladding material and provided with an insulation gasket on the periphery thereof. In this manner, a pressure was applied to an electrode group including the negative electrode, the separator, and the counter electrode between a bottom surface of the container and the sealing plate, thereby ensuring a contact between the components. Thus, a coin-type sodium molten-salt battery (half-cell) B1 having a designed capacity of 1.5 mAh was fabricated.

(Fabrication of Rectangular Sodium Molten-Salt Battery)

The rectangular negative electrode, counter electrode, and separator were dried sufficiently by heating at 90° C. or higher at a reduced pressure of 0.3 Pa. Subsequently, a lead piece was connected to each of the negative electrode and the counter electrode. The negative electrode and the counter electrode were arranged to face each other with the separator therebetween, thereby forming a flat electrode group. Next, the electrode group was housed in a bag-like container formed of a laminated film that included an aluminum foil as a barrier layer. A predetermined amount of the molten-salt electrolyte B1 was poured into the container. An inlet of the bag was then sealed by fusion-bonding in a reduced-pressure atmosphere, but the lead pieces were led from the fusion-bonded portion of the container. Next, the electrode group was pressed in the thickness direction to ensure a contact between the components. Thus, a rectangular sodium molten-salt battery (half-cell) B1 having a designed capacity of 24 mAh was fabricated.

Comparative Example 1

A coin-type sodium molten-salt battery A1 and a rectangular sodium molten-salt battery A1 were fabricated as in Example 1 except that the molten-salt electrolyte A1 was used instead of the molten-salt electrolyte B1.

[Evaluation 1]

The coin-type sodium molten-salt batteries of Example 1 and Comparative Example 1 were heated to 90° C. in a thermostatic chamber. In a state in which the temperature was stabilized, charging and discharging were performed for 100 cycles in which the conditions of (1) and (2) below were defined as one cycle. A ratio (capacity retention rate) of the discharge capacity of the 50th cycle or the 100th cycle to the discharge capacity of the first cycle was determined.

Figure 7:
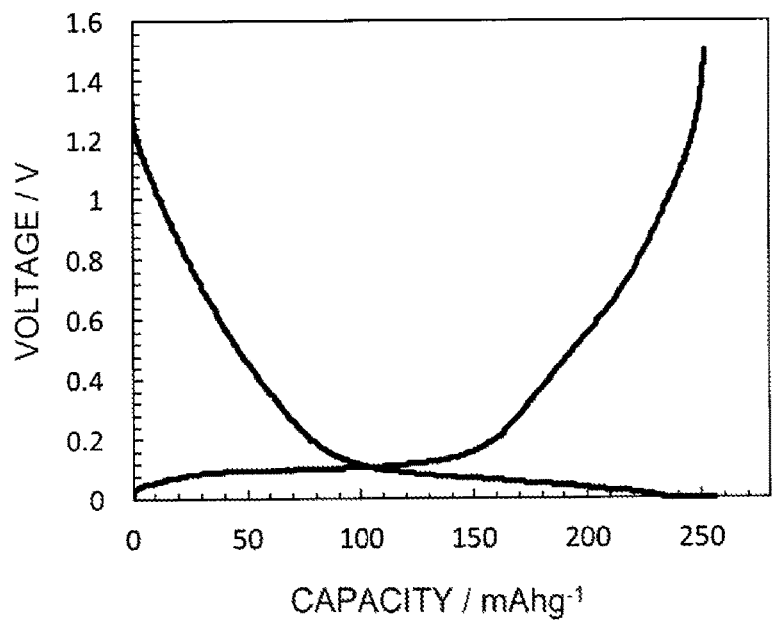
FIG. 7 includes charge-discharge curves of a sodium molten-salt battery of Example 1.
Figure 8:
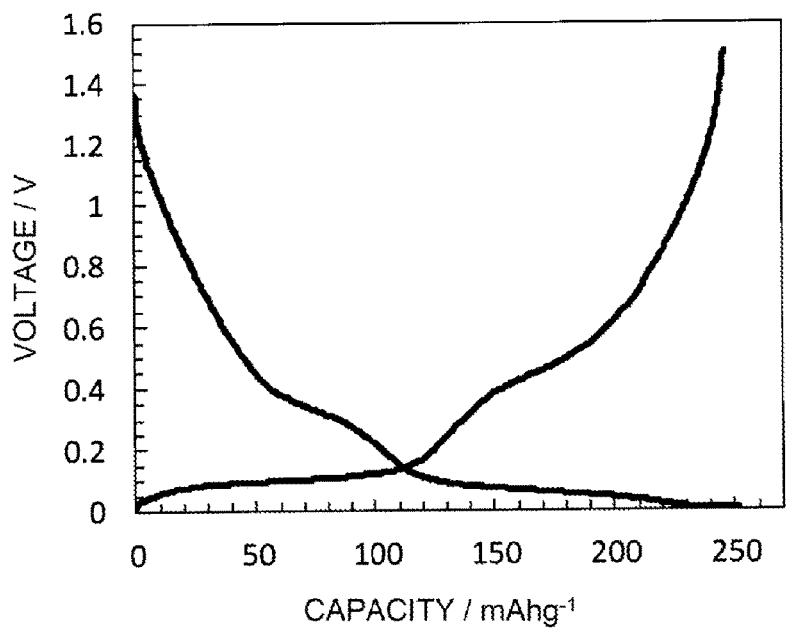
FIG. 8 includes charge-discharge curves of a sodium molten-salt battery of Comparative Example 1.

(1) Charging at a charging current of 0.2 C up to a charging termination voltage of 0.005 V (2) Discharging at a discharging current of 0.2 C down to a discharging termination voltage of 1.5 V Table I shows the results of the capacity retention rate. FIG. 7 shows charge-discharge curves of the battery B1 of Example 1. Furthermore, FIG. 8 shows charge-discharge curves of the battery A1 of Comparative Example 1.

Examples 2 to 4

When the commercially available MPPY.FSI was purified by passing through the column filled with zeolite, the length of the column was adjusted to change the concentration of impurities contained in the ionic liquid. Thereby, molten-salt electrolytes B2 to B4 containing an inorganic ammonium ion ($NH_4^+$) as an impurity in an amount of 50 ppm, 500 ppm, and 1,000 ppm, respectively and each composed of a mixture containing the MPPY.FSI and Na.FSI at a molar ratio MPPY.FSI:Na.FSI of 90:10 were prepared. Coin-type sodium molten-salt batteries B2 to B4 and rectangular sodium molten-salt batteries B2 to B4 were fabricated as in Example 1 except that the molten-salt electrolytes B2 to B4 were respectively used instead of the molten-salt electrolyte B1. Subsequently, the capacity retention rates of the coin-type sodium molten-salt batteries B2 to B4 were evaluated as in the method described above. Table I shows the results.

Comparative Example 2

When the commercially available MPPY.FSI was purified by passing through the column filled with zeolite, the length of the column was adjusted. A molten-salt electrolyte A2 that contained 2,000 ppm of an inorganic ammonium ion ($NH_4^+$) as an impurity and that was composed of a mixture containing the MPPY.FSI and Na.FSI at a molar ratio MPPY.FSI:Na.FSI of 90:10 was prepared. A coin-type sodium molten-salt battery A2 and a rectangular sodium molten-salt battery A2 were fabricated as in Example 1 except that the molten-salt electrolyte A2 was used instead of the molten-salt electrolyte B1. Subsequently, the capacity retention rates of the coin-type sodium molten-salt battery A2 were evaluated as in the method described above. Table I shows the results.

TABLE I

| | Capacity retention rate (%) | | | | | |
|---|---|---|---|---|---|---|
| | Example 1 (Battery B1) | Example 2 (Battery B2) | Example 3 (Battery B3) | Example 4 (Battery B4) | Comparative example 1 (Battery A1) | Comparative example 2 (Battery A2) |
| $NH_4$ concentration | ≈0 ppm | 50 ppm | 500 ppm | 1,000 ppm | 5,000 ppm | 2,000 ppm |
| 50 cycles | 99% | 99% | 97% | 95% | 90% | 92% |
| 100 cycles | 98% | 98% | 96% | 94% | 85% | 87% |

Referring to Table I, it is understood that the capacity retention rate significantly improves when the concentration of an ammonium cation contained as an impurity in the molten-salt electrolyte is 1,000 ppm or less.

Referring to FIGS. 7 and 8, it is understood that peaks relating to intercalation and deintercalation of ammonium cations are observed in the charge-discharge curves of Comparative Example 1. These peaks are due to a side reaction and relate to the decrease in the capacity retention rate.

[Evaluation 2]

Charging and discharging of the rectangular sodium molten-salt batteries B1 to B4 of Examples 1 to 4 and the rectangular sodium molten-salt batteries A1 and A2 of Comparative Examples 1 and 2 were repeated for 1,000 cycles. An increasing ratio of the battery thickness of the 1000th cycle to the battery thickness of the first cycle was determined.

Table II shows the results of the thickness increasing ratio.

TABLE II

| | Thickness increasing ratio (%) | | | | | |
|---|---|---|---|---|---|---|
| | Example 1 (Battery B1) | Example 2 (Battery B2) | Example 3 (Battery B3) | Example 4 (Battery B4) | Comparative example 1 (Battery A1) | Comparative example 2 (Battery A2) |
| $NH_4$ concentration | ≈0 ppm | 50 ppm | 500 ppm | 1,000 ppm | 5,000 ppm | 2,000 ppm |
| 1,000 cycles | 15% | 4% | 6% | 9% | 18% | 17% |

Referring to Table II, it is understood that in the case where the concentration of the ammonium cation contained in the molten-salt electrolyte as impurities is 50 ppm or more and 1,000 ppm or less (preferably 500 ppm or less), an effect of suppressing generation of gas is obtained when a charge-discharge cycle is repeated for a long period of time.

Examples 5 to 8

A molten-salt electrolyte C1 composed of a mixture containing a commercially available sodium.bis(trifluoromethylsulfonyl)imide (Na.TFSI: sodium salt) and a commercially available 1-methyl-1-propylpyrrolidinium.bis(trifluoromethylsulfonyl)imide (MPPY.TFSI: ionic liquid) at a molar ratio Na.TFSI:MPPY.TFSI of 10:90 was prepared.

Impurities in the molten-salt electrolyte C1 were analyzed by ion chromatography. According to the result, an inorganic ammonium ion ($NH_4^+$) was contained as an impurity in an amount of 5,000 ppm or more.

Next, the commercially available MPPY.TFSI was purified by passing through a column filled with zeolite (HS-320 manufactured by Wako Pure Chemical Industries, Ltd.), and then mixed with Na.TFSI. Thus, a molten-salt electrolyte D1 composed of a mixture containing MPPY.TFSI and Na.TFSI at a molar ratio MPPY.TFSI:Na.TFSI of 90:10 was prepared.

Impurities in the molten-salt electrolyte D1 were analyzed by ion chromatography. According to the result, an inorganic ammonium ion ($NH_4^+$) was not detected.

When the commercially available MPPY.TFSI was purified by passing through the column filled with zeolite, the length of the column was adjusted to change the concentration of impurities contained in the ionic liquid. Thereby, molten-salt electrolytes D2 to D4 containing an inorganic ammonium ion ($NH_4^+$) as an impurity in an amount of 50 ppm, 500 ppm, and 1,000 ppm, respectively and each composed of a mixture containing the MPPY.TFSI and Na.TFSI at a molar ratio MPPY.TFSI:Na.TFSI of 90:10 were prepared.

Coin-type sodium molten-salt batteries D1 to D4 were fabricated as in Example 1 except that the molten-salt electrolytes D1 to D4 were respectively used instead of the molten-salt electrolyte B1.

Comparative Example 3

A coin-type sodium molten-salt battery C1 was fabricated as in Example 1 except that the molten-salt electrolyte C1 was used instead of the molten-salt electrolyte B1.

[Evaluation 3]

The capacity retention rates of the coin-type sodium molten-salt batteries D1 to D4 of Examples 5 to 8 and the coin-type sodium molten-salt battery C1 of Comparative Example 3 were also measured as in the method described above. Table III shows the results.

TABLE III

| | Capacity retention rate (%) | | | | |
|---|---|---|---|---|---|
| | Example 5 (Battery D1) | Example 6 (Battery D2) | Example 7 (Battery D3) | Example 8 (Battery D4) | Comparative example 3 (Battery C1) |
| $NH_4$ concentration | ≈0 ppm | 50 ppm | 500 ppm | 1,000 ppm | 5,000 ppm |
| 50 cycles | 99% | 99% | 96% | 94% | 88% |
| 100 cycles | 99% | 98% | 95% | 93% | 84% |

Referring to Table III, it is understood that, also in the cases where the type of ionic liquid is different, the capacity retention rate significantly improves when the concentration of an ammonium cation contained as an impurity in the molten-salt electrolyte is 1,000 ppm or less.

Examples 9 to 12

A molten-salt electrolyte E1 composed of a mixture containing a commercially available sodium.bis(fluorosulfonyl)imide (Na.FSI: sodium salt) and a commercially available 1-butyl-1-methylpyrrolidinium.bis(fluorosulfonyl)imide (MBPY.FSI: ionic liquid) at a molar ratio Na.FSI:MBPY.FSI of 10:90 was prepared.

Impurities in the molten-salt electrolyte E1 were analyzed by ion chromatography. According to the result, an inorganic ammonium ion ($NH_4^+$) was contained as an impurity in an amount of 5,000 ppm or more.

Next, the commercially available MBPY.FSI was purified by passing through a column filled with zeolite (HS-320 manufactured by Wako Pure Chemical Industries, Ltd.), and then mixed with Na.FSI. Thus, a molten-salt electrolyte F1 composed of a mixture containing MBPY.FSI and Na.FSI at a molar ratio MBPY.FSI:Na.FSI of 90:10 was prepared.

Impurities in the molten-salt electrolyte F1 were analyzed by ion chromatography. According to the result, an inorganic ammonium ion ($NH_4^+$) was not detected.

When the commercially available MBPY.FSI was purified by passing through the column filled with zeolite, the length of the column was adjusted to change the concentration of impurities contained in the ionic liquid. Thereby, molten-salt electrolytes F2 to F4 containing an inorganic ammonium ion ($NH_4^+$) as an impurity in an amount of 50 ppm, 500 ppm, and 1,000 ppm, respectively and each composed of a mixture containing the MBPY.FSI and Na.FSI at a molar ratio MBPY.FSI:Na.FSI of 90:10 were prepared.

Coin-type sodium molten-salt batteries F1 to F4 were fabricated as in Example 1 except that the molten-salt electrolytes F1 to F4 were respectively used instead of the molten-salt electrolyte B1.

Comparative Example 4

A coin-type sodium molten-salt battery E1 was fabricated as in Example 1 except that the molten-salt electrolyte E1 was used instead of the molten-salt electrolyte B1.

[Evaluation 4]

Also in Examples 9 to 12 and Comparative Example 4, the capacity retention rates were measured as in the method described above. Table IV shows the results.

TABLE IV

| | Capacity retention rate (%) | | | | |
|---|---|---|---|---|---|
| | Example 9 (Battery F1) | Example 10 (Battery F2) | Example 11 (Battery F3) | Example 12 (Battery F4) | Comparative example 4 (Battery E1) |
| $NH_4$ concentration | ≈0 ppm | 50 ppm | 500 ppm | 1,000 ppm | 5,000 ppm |
| 50 cycles | 99% | 98% | 96% | 93% | 87% |
| 100 cycles | 98% | 98% | 95% | 91% | 85% |

Referring to Table IV, it is understood that, also in the cases where the type of ionic liquid is different, the capacity retention rate significantly improves when the concentration of an ammonium cation contained as an impurity in the molten-salt electrolyte is 1,000 ppm or less.

INDUSTRIAL APPLICABILITY

The sodium molten-salt battery according to the present invention has good charge-discharge cycle characteristics. Therefore, the sodium molten-salt battery according to the present invention is useful in applications in which long-term reliability is required, for example, as a large-scale power storage device for household or industrial use and a power source for electric cars, hybrid cars, or the like.

REFERENCE SIGNS LIST

1: separator, 2: positive electrode, 2a: positive electrode current collector, 2b: positive electrode active material layer, 2c: positive electrode lead piece, 3: negative electrode, 3a: negative electrode current collector, 3b: negative electrode active material layer, 3c: negative electrode lead piece, 7: nut, 8: flange, 9: washer, 10: battery case, 11: electrode group, 12: container body, 13: lid, 14: external positive electrode terminal, 15: external negative electrode terminal, 16: safety valve, 100: molten-salt battery a hydrogen atom or a methyl group.

The invention claimed is:
1. A sodium molten-salt battery comprising:
a positive electrode that contains a positive electrode active material;
a negative electrode that contains a negative electrode active material; and
a molten-salt electrolyte that contains a sodium salt and an ionic liquid that dissolves the sodium salt,
wherein the negative electrode active material contains non-graphitizable carbon,
the ionic liquid is a salt of a bis(sulfonyl)imide anion and a first onium cation that does not cause a Faradaic reaction with the non-graphitizable carbon,
the molten-salt electrolyte contains a second onium cation in an amount of 50 to 500 ppm by mass, and the second onium cation is represented by a general formula (1): $R^1R^2R^3R^4N^+$
where $R^1$ to $R^4$ are each independently a hydrogen atom or a methyl group.
2. The sodium molten-salt battery according to claim 1, wherein the first onium cation is an organic onium cation having a nitrogen-containing heterocycle.

3. The sodium molten-salt battery according to claim 2, wherein the nitrogen-containing heterocycle has a pyrrolidine skeleton.

4. The sodium molten-salt battery according to claim 1, wherein the sodium salt is a salt of a sodium ion and a bis(sulfonyl)imide anion.

* * * * *